United States Patent
Neill et al.

(10) Patent No.: US 12,289,439 B2
(45) Date of Patent: Apr. 29, 2025

(54) SYSTEMS AND METHODS FOR CURING NETWORK DEFICIENCIES IN VIDEO NETWORKS

(71) Applicant: TYCO FIRE & SECURITY GMBH, Neuhausen am Rheinfall (CH)

(72) Inventors: Terence Neill, Lisburn (GB); Ronan Patrick Bloomer, Milwaukee, WI (US)

(73) Assignee: TYCO FIRE & SECURITY GMBH, Neuhausen am Rheinfall (CH)

(*) Notice: Subject to any disclaimer, the term of this patent is extended or adjusted under 35 U.S.C. 154(b) by 30 days.

(21) Appl. No.: 18/347,311

(22) Filed: Jul. 5, 2023

(65) Prior Publication Data

US 2024/0040109 A1 Feb. 1, 2024

Related U.S. Application Data

(60) Provisional application No. 63/393,131, filed on Jul. 28, 2022.

(51) Int. Cl.
*H04N 7/18* (2006.01)
*H04N 5/77* (2006.01)
*H04N 17/00* (2006.01)
*H04N 23/62* (2023.01)

(52) U.S. Cl.
CPC ............. *H04N 17/002* (2013.01); *H04N 5/77* (2013.01); *H04N 7/181* (2013.01); *H04N 23/62* (2023.01)

(58) Field of Classification Search
CPC ........ H04N 17/002; H04N 23/62; H04N 5/77; H04N 7/181
USPC ...................................................... 348/159
See application file for complete search history.

(56) References Cited

U.S. PATENT DOCUMENTS

| 6,816,456 | B1   | 11/2004 | Tse-Au   |              |
|-----------|------|---------|----------|--------------|
| 8,922,658 | B2 * | 12/2014 | Galvin   | H04N 21/6125 |
|           |      |         |          | 348/E7.054   |
| 9,699,400 | B2 * | 7/2017  | Kardashov| H04N 5/77    |
| 2010/0045810 | A1 * | 2/2010 | Chun-Ru | H04N 21/4223 |
|           |      |         |          | 375/E7.076   |

(Continued)

FOREIGN PATENT DOCUMENTS

GB 2544811 A 5/2017

OTHER PUBLICATIONS

International Search Report and Written Opinion in PCT/US2023/070448, mailed Oct. 2, 2023, 11 pages.

*Primary Examiner* — Trang U Tran
(74) *Attorney, Agent, or Firm* — ArentFox Schiff LLP

(57) ABSTRACT

Example implementations include a method, apparatus and computer-readable medium for adjusting bandwidth in video networks, comprising monitoring a video network comprising a plurality of cameras and a network video recorder (NVR). The implementations include receiving, at a first time, a first plurality of network parameters associated with data transmitted from each of the plurality of cameras and a second plurality of network parameters associated with data received by the NVR. The implementations include identifying, using a plurality of rules, a discrepancy between the first plurality of network parameters and the second plurality of network parameters. The implementations further include transmitting, to the at least one camera, an instruction to adjust a peak bandwidth limit of the at least one camera to a new value, in response to identifying the discrepancy.

20 Claims, 6 Drawing Sheets

(56) References Cited

U.S. PATENT DOCUMENTS

2010/0097473 A1    4/2010   Park et al.
2018/0260269 A1*   9/2018   Kuo .................... G06F 11/0793

* cited by examiner

SYSTEMS AND METHODS FOR CURING NETWORK DEFICIENCIES IN VIDEO NETWORKS

CROSS-REFERENCE TO RELATED APPLICATIONS

This application claims the benefit of U.S. Provisional Application No. 63/393,131, filed Jul. 28, 2022, which is incorporated herein by reference.

TECHNICAL FIELD

The described aspects relate to network-based camera systems.

BACKGROUND

When building networks include large numbers of surveillance cameras, there are sometimes network bandwidth issues (e.g., bandwidth capacity being exceeded). Video traffic is generally unidirectional in such networks (from camera to a network video recorder (NVR)) and connectionless (e.g., user datagram protocol (UDP)) transmission is usually preferred for minimum latency. When using H.264/5 encoding mechanisms, the video is also spiky (large I-frames, small P-frames).

When network bandwidth is exceeded, the problem may manifest as delays and jitter in live video being viewed on a client device or as a sporadic loss of video being recorded. The problem is further complicated by the fact that, because of the spiky nature of video frames being received, the problem may disappear for a long period of time and then reappear, depending upon whenever bandwidth spikes from the cameras occur.

The traditional approach to addressing this problem has been to wait until the problem occurs (e.g., a complaint arrives from a customer). Time is then spent looking at the network topology to assess where bottlenecks are occurring. For example, using network trace tools such as wireshark, manual comparisons are held between camera captured wiresharks and NVR captured wiresharks to identify differences. In most cases, the bandwidth of the network equipment between the camera and the client receiving the video cannot be further increased without cable or network equipment upgrades. Unfortunately, customers tend to avoid such upgrades due to the cost demands associated with them.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method for adjusting bandwidth in video networks, comprising monitoring a video network comprising a plurality of cameras and a network video recorder (NVR). The method further includes receiving, at a first time, a first plurality of network parameters associated with data transmitted from each of the plurality of cameras and a second plurality of network parameters associated with data received by the NVR. Additionally, the method further includes identifying, using a plurality of rules, a discrepancy between the first plurality of network parameters and the second plurality of network parameters, wherein the discrepancy indicates that data from at least one camera in the plurality of cameras is not received by the NVR within a threshold period of time. Additionally, the method further includes transmitting, to the at least one camera, an instruction to adjust a peak bandwidth limit of the at least one camera to a new value, in response to identifying the discrepancy.

Another example aspect includes an apparatus for adjusting bandwidth in video networks, comprising a memory and a processor coupled with the memory. The processor is configured to monitor a video network comprising a plurality of cameras and a network video recorder (NVR). The processor is further configured to receive, at a first time, a first plurality of network parameters associated with data transmitted from each of the plurality of cameras and a second plurality of network parameters associated with data received by the NVR. Additionally, the processor further configured to identify, using a plurality of rules, a discrepancy between the first plurality of network parameters and the second plurality of network parameters, wherein the discrepancy indicates that data from at least one camera in the plurality of cameras is not received by the NVR within a threshold period of time. Additionally, the processor further configured to transmit, to the at least one camera, an instruction to adjust a peak bandwidth limit of the at least one camera to a new value, in response to identifying the discrepancy.

Another example aspect includes an apparatus for adjusting bandwidth in video networks, comprising means for monitoring a video network comprising a plurality of cameras and a network video recorder (NVR). The apparatus further includes means for receiving, at a first time, a first plurality of network parameters associated with data transmitted from each of the plurality of cameras and a second plurality of network parameters associated with data received by the NVR. Additionally, the apparatus further includes means for identifying, using a plurality of rules, a discrepancy between the first plurality of network parameters and the second plurality of network parameters, wherein the discrepancy indicates that data from at least one camera in the plurality of cameras is not received by the NVR within a threshold period of time. Additionally, the apparatus further includes means for transmitting, to the at least one camera, an instruction to adjust a peak bandwidth limit of the at least one camera to a new value, in response to identifying the discrepancy.

Another example aspect includes a computer-readable medium having instructions stored thereon for adjusting bandwidth in video networks, wherein the instructions are executable by a processor to monitor a video network comprising a plurality of cameras and a network video recorder (NVR). The instructions are further executable to receive, at a first time, a first plurality of network parameters associated with data transmitted from each of the plurality of cameras and a second plurality of network parameters associated with data received by the NVR. Additionally, the instructions are further executable to identify, using a plurality of rules, a discrepancy between the first plurality of network parameters and the second plurality of network parameters, wherein the discrepancy indicates that data from at least one camera in the plurality of cameras is not received by the NVR within a threshold period of time. Additionally, the instructions are further executable to transmit, to the at least one camera, an instruction to adjust a peak bandwidth limit of the at least one camera to a new value, in response to identifying the discrepancy.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, wherein dashed lines may indicate optional elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure describes combating the network issues in camera systems by actively monitoring and adjusting camera outbound traffic bandwidth to acceptable level(s). To achieve such level(s), iterative adjustments are made until the videos transmitted in the network are stable with minimal delay and no losses.

Figure 1:
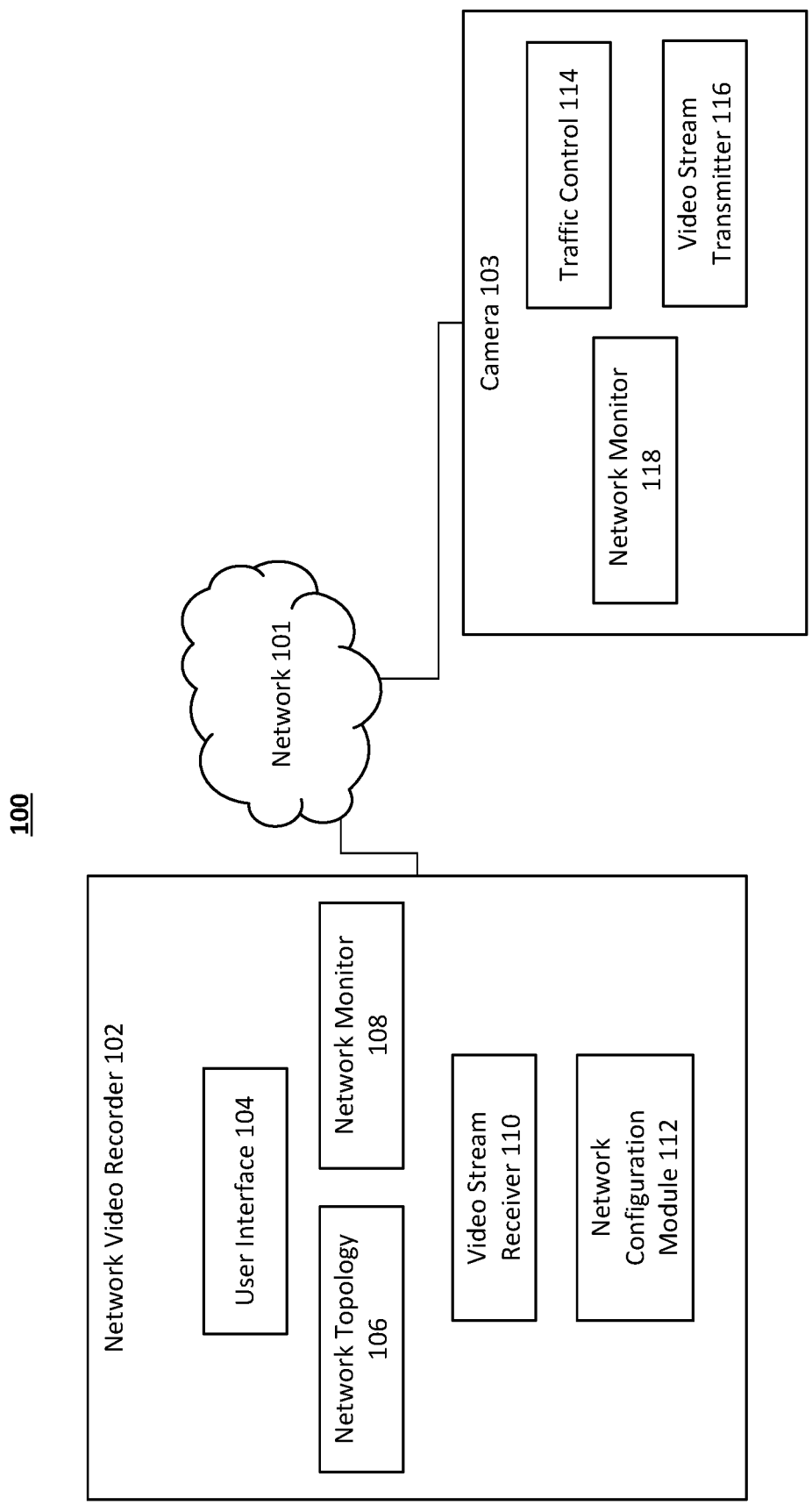
FIG. 1 is a block diagram of a system including a camera and a network video recorder.

FIG. 1 is a block diagram of system 100 including a camera 103 and a network video recorder (NVR) 102. Camera 103 and NVR 102 may be connected by network 101 (e.g., a local area network (LAN) or a wide area network (WAN) such as the Internet). NVR 102 includes user interface 104 that provides users with access to the data acquired by network monitor 108. For example, a user may be able to view network topology 106 of network 101 via user interface 104. In particular, network monitor 108 may collect information about incoming packets from cameras such as camera 103 and outgoing packets from NVR 102. For example, video stream transmitter 116 of camera 103 may transmit live video to video stream receiver 110. Network monitor 108 may evaluate when the packets of the live video are received, the quality of the stream, and attributes related to bandwidth. Network monitor 118 may further transmit network information to NVR 102 (e.g., the amount of packets sent, the associated times, bandwidth limits, etc.). Network configuration module 112 may compare the network parameters acquired by network monitor 108 and network monitor 118, and detect certain deficiencies (e.g., jitter, packet loss, delays, etc.). Based on the deficiencies detected, network configuration module 112 may transmit a remediation instruction to traffic control 114 on camera 103. Traffic control 114 may be a module that is configured to adjust network features of camera 103 (e.g., bandwidth limits).

In some aspects, network monitors 108 and 118 are protocol aware (e.g. Real Time Streaming Protocol (RTSP), Real-time Transport Protocol (RTP), Hypertext Transfer Protocol (HTTP)) and video stream aware (e.g., resolution, codec, and frame rate) and may be able to monitor individual video streams being transmitted from camera 103. Network monitor 118 may, for example, record key parameters for a transmitted video stream, including a number of packets transmitted, a number of bytes transmitted, an average and/or maximum and/or minimum frame time delta (or difference), and a peak and average bandwidth. Network monitor 108 may, for example, record key parameters for a received video stream, including a number of packets received, a number of bytes received, an average and/or maximum and/or minimum time delta, and a peak and average bandwidth. In some aspects, these parameters are recorded continuously or periodically over a fixed period (e.g., 10 seconds) and uploaded to NVR 102 using a reliable transmission method (e.g., transmission control protocol (TCP)).

In some aspects, network monitor 108 may be a custom plugin to an existing monitoring tool (e.g., Zabbix). Network monitor 108 on NVR 102 may collect the same information as collected on the camera over the same interval (note that time synchronization between camera 103 and NVR 102 may be performed by network monitor 108). Periodically (e.g., every 60 seconds to minimize issues caused by network latency), network configuration module 112 may compare the transmitted parameters received from camera 103 (collected by network monitor 118) and the received parameters acquired by network monitor 108.

Network configuration module 112 may utilize a plurality of rules to detect network deficiencies. For example, if network configuration module 112 determines a difference in the number of packets received and the number of packets transmitted, network configuration module 112 will determine that there is packet loss in network 101. This may be caused by the bandwidth being exceeded at some point in network 101. In another example, if network configuration module 112 determines that the received frame deltas are significantly different (e.g., by more than a threshold difference) between the transmitted frames and the received frames, network configuration module 112 will determine that there is significant network congestion.

Expanding on the example of frame deltas, the threshold difference may represent an acceptable frame delay limit, which may depend on the frame rate of the video stream. For example, a frame delay of 40 milliseconds (ms) will be unacceptable at 30 frames per second (fps) (because it is greater than the delta between two frames) but will be acceptable for a video stream at 15 fps (because the delta between frames is 66 ms). The same logic is applicable to parameters such as the peak bandwidth.

Network configuration module 112 allows for the customization of thresholds associated with bandwidth adjustment actions. For example, the threshold difference for frame deltas may be adjustable. A user may establish rules that deem a frame delay of up to 66 ms to be acceptable at 15 frames per second. Module 112 may also allow limits to be set on the amount of bandwidth adjustments that can be performed on camera 103. These limits may include a limit on an amount of iterations allowed for adjustments in a period of time (e.g., no more than 10 adjustments in 5 minutes) to prevent constant changes. These limits may include a limit on the actual bandwidth (e.g., no higher than bandwidth X and no lower than bandwidth Y). This will prevent the camera bandwidth from being adjusted too low to the point where video streams no longer function. In this case, functionality is based on whether the video stream can be streamed at a minimum frames per second rate (e.g., 20 fps).

When a network deficiency is detected, network configuration module 112 is configured to adjust the maximum bandwidth of the camera downwards in small (e.g., 5 Mbps) decrements over a period of time (e.g., of the order of 10s of minutes) until there are no more packets lost and the frame delays become acceptable. It should be noted that network configuration module 112 will not perform such adjustments on a single camera in isolation, but will also perform adjustments across multiple cameras.

Although, there is a risk that network configuration module 112 will adjust camera bandwidth incorrectly and will not alleviate the problem, network configuration module 112 is also capable of utilizing a network topology graph (e.g., network topology 106). Network topology 106 identifies the IP addresses of all the cameras connected to NVR 102 and depicts how the intervening switches and routers are connected.

When a problem is identified with one or more cameras, network configuration module 112 will use network topology 106 to calculate which cameras should have their bandwidth adjusted. For example, if there are three cameras connected to a single switch and one of the cameras is experiencing a network problem, network configuration module 112 may adjust the bandwidth downwards on all three cameras to alleviate the problem. Network configuration module 112 achieves this using the plurality of rules described above that will be applied for various network configuration scenarios.

Figure 2:
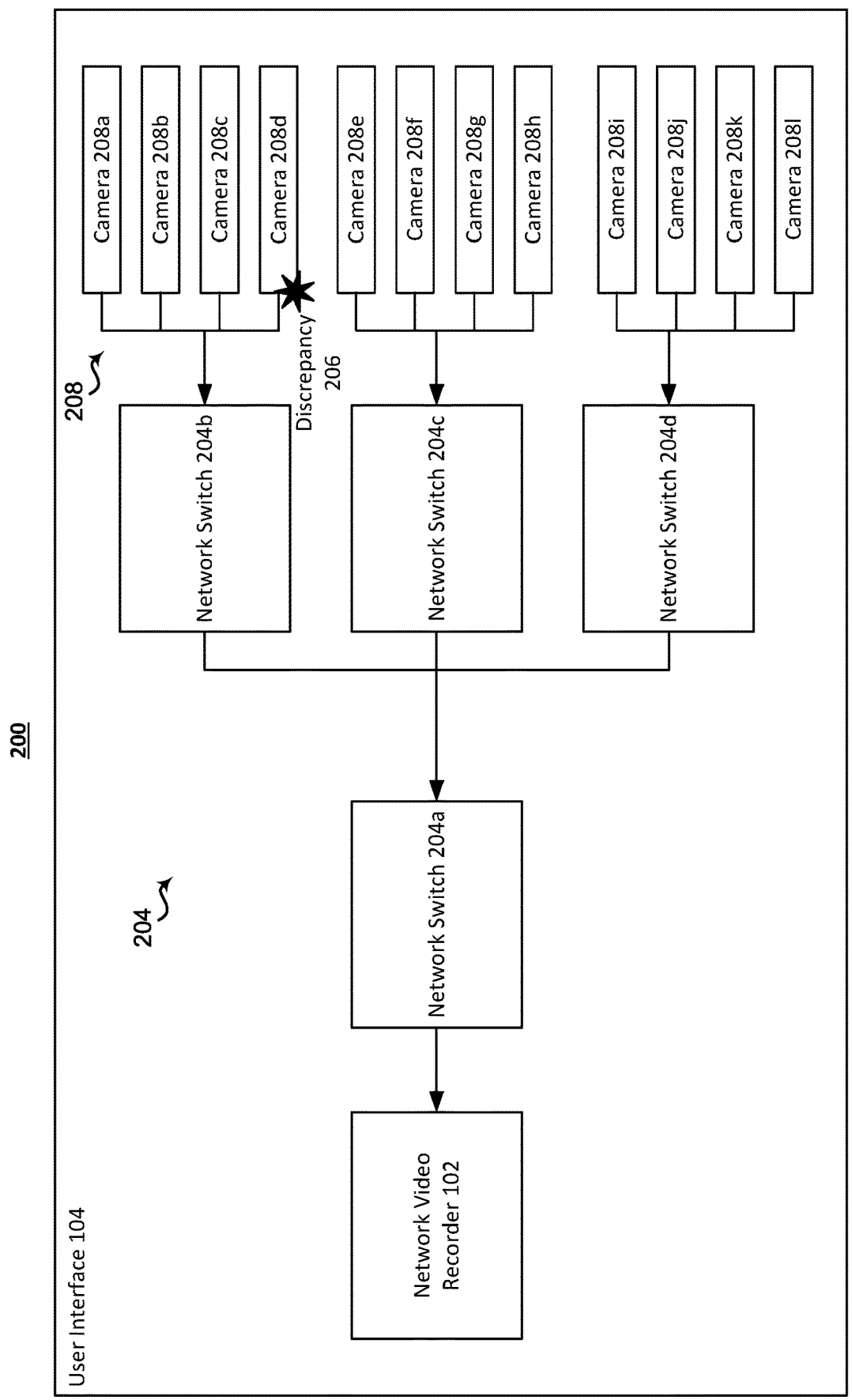
FIG. 2 is a diagram of a user interface depicting network topology.

FIG. 2 is diagram 200 of user interface 104 depicting network topology 106. Network topology 106 may be organized as a block diagram that shows the connections in network 101. For example, NVR 102 is connected to cameras 208 via network switches 204. More specifically, cameras 208a, 208b, 208c, and 208d are connected to network switch 204b. Cameras 208e, 208f, 208g, and 208h are connected to network switch 204c. Cameras 208i, 208j, 208k, and 208l are connected to network switch 204d. Network switches 204b, 204c, and 204d are connected to network switch 204a, which is connected to NVR 102.

Network configuration module 112 may determine that camera 208d is sending videos to NVR 102 with a great amount of delay that exceeds a threshold delay. Because none of the other cameras 208a, 208b, and 208c are experiencing the issue, network configuration module 112 may determine that discrepancy 206 (i.e., the packet delay) exists between the connection of camera 208d and network switch 204b. If all cameras connected to network switch 204b experienced the delay, but none of the other cameras in network 101 showed signs of the delay, then discrepancy 206 may be located between network switch 204b and network switch 204a.

Network configuration module 112 may generate, for display on user interface 104, indicator of discrepancy 206 in the corresponding location of network topology 106. For example, in FIG. 2, discrepancy 206 is shown as a star icon next to a block representing camera 208d.

User interface 104 may feature, on the dashboard, a display that superimposes the camera network status on network topology 106 (as shown in FIG. 2). This will aid in identifying troublesome paths in network 101.

User interface 104 may include a dashboard that provides a list of cameras with live information on configured bandwidth, packet loss, and packet delay. In one example, a camera status will show as the color "green" if the camera is functioning correctly (no packet loss, acceptable frame delay, and no bandwidth adjustment), the color "amber" if the camera is functioning correctly but there has been a bandwidth adjustment to make the camera function correctly, and the color "red" if the camera the camera bandwidth has been adjusted to the minimum acceptable bandwidth, but the camera is still experiencing problems after a threshold period of time.

Another example of how such a dashboard may appear for user interface 104 is shown in Table 1 below:

TABLE 1

| Example Network Configuration Dashboard | | | | | |
|---|---|---|---|---|---|
| Camera | RX Packet Loss | Max RX Frame Delay (ms) | RX Peak Bandwidth (Mbps) | TX Peak Bandwidth (Mbps) | Peak Bandwidth Limit (Mbps) | Overall Status |
| 192.168.1.10 | 0 | 5 | 120 | 120 | N/A | Green |
| 192.168.1.11 | 0 | 5 | 95 | 95 | N/A | Green |
| 192.168.1.12 | 0 | 24 | 80 | 80 | 80 | Amber |
| 192.168.1.13 | 0 | 26 | 80 | 80 | 80 | Amber |
| 192.168.1.14 | 1000 | 100 | 30 | 60 | 60 | Red |
| 192.168.1.15 | 4500 | 90 | 40 | 60 | 60 | Red |

In this example, the first two cameras (192.168.1.10 and 192.168.1.11) are not experiencing any issues. Their status shows up green in the dashboard. The next two cameras (192.168.1.12 and 192.168.1.13) are also not experiencing problems. However, in this case, a peak bandwidth adjustment has had to be performed by the network configuration module in order to achieve this (the limit is set to 80 Mbps), so the cameras are showing up as amber in the status. For the final two cameras (192.168.1.14 and 192.168.1.15), they are still experiencing problems. The peak bandwidth has been adjusted to 60 Mbps (which is the minimum that the user has configured for the link) but this has not fixed the problem. In this case, network configuration module 112 may recommend that the user change camera parameters for those cameras. In some aspects, the network configuration module 112 may further recommend camera parameters that the user should change. For example, network configuration module 112 may recommend that the user reduce a frame rate of the camera, lower the resolution of the camera, etc. In some aspects, a user may select an option to reduce frame rate by a certain amount of frames (e.g., 60 fps to 30 fps). Accordingly, the network configuration module 112 may transmit a command to the camera to reduce frame rate by the indicated amount.

Figure 3:
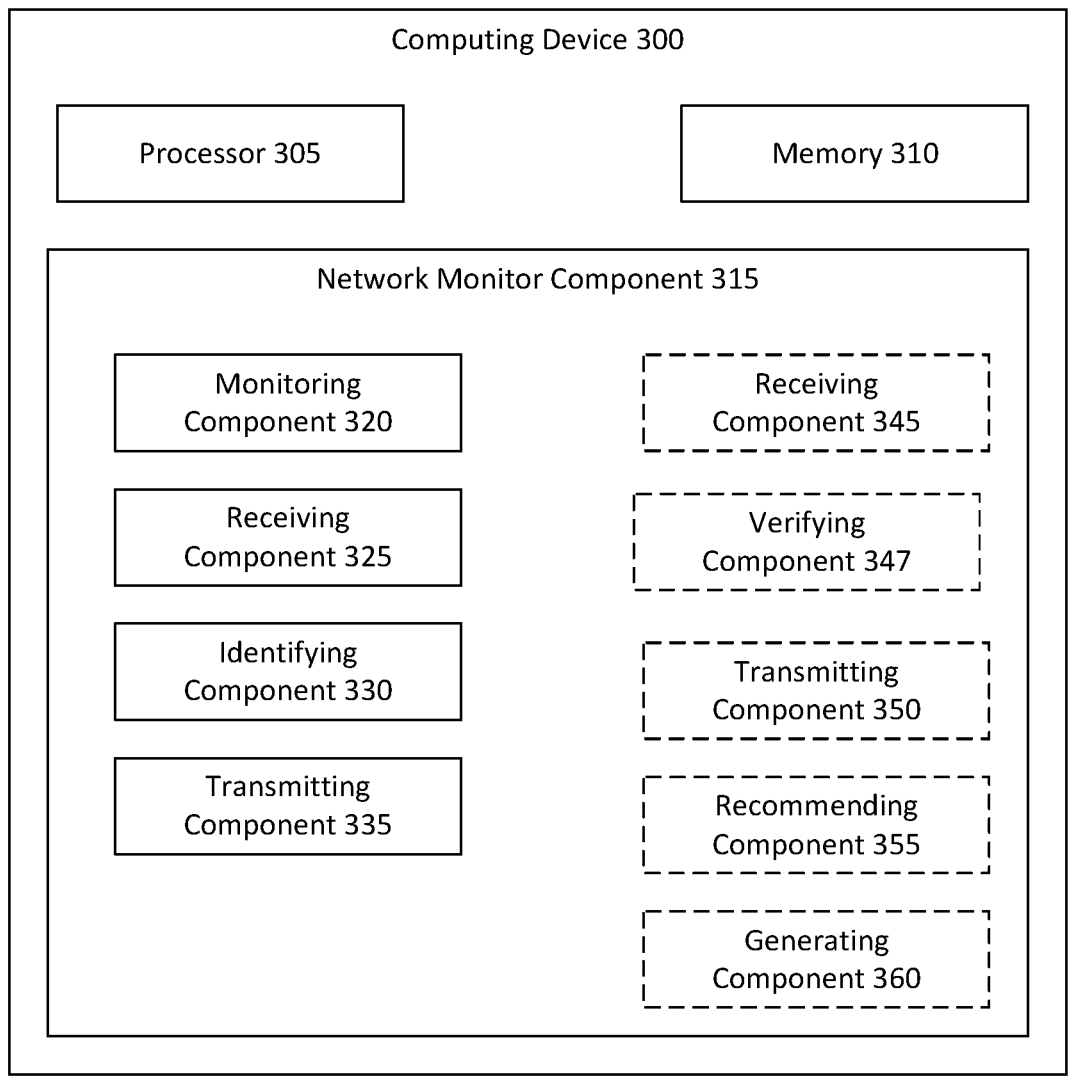
FIG. 3 is a block diagram of an example of a computer device having components configured to perform a method for adjusting bandwidth in video networks.
Figure 4:
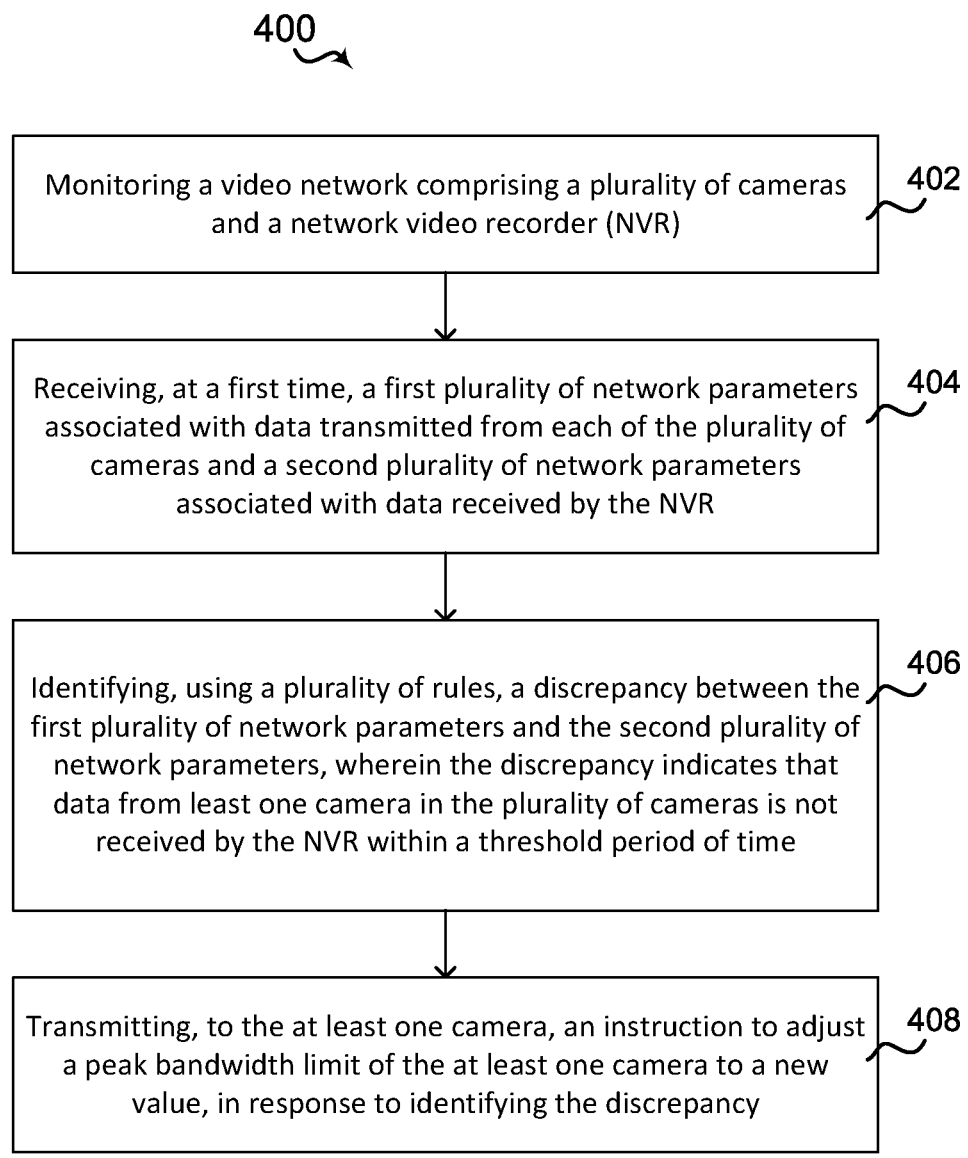
FIG. 4 is a flowchart of an example of a method for adjusting bandwidth in video networks.

Referring to FIG. 3 and FIG. 4, in operation, computing device 300 may perform a method 400 of adjusting bandwidth in video networks, by execution of network monitor component 315 by one or more processors 305 (individually or in combination) and/or one or more memories 310. Although one memory 310 and one processor 305 is shown in FIG. 3 for simplicity, these components may be made up of multiple memories and processors. Network monitor component 315 may be made up of network monitor 108 and/or network configuration module 112.

At block 402, the method 400 includes monitoring a video network comprising a plurality of cameras and a network video recorder (NVR). For example, in an aspect, computing device 300, processor 305, memory 310, network monitor component 315, and/or monitoring component 320 may be configured to or may comprise means for monitoring a video network comprising a plurality of cameras (e.g., cameras 208a-1) and NVR 102. For example, the monitoring may include keeping track of one or more attributes or characteristics (e.g., the number of packets exchanged) of the cameras 103 (and/or cameras 208) and their connections with the NVR 102.

At block 404, the method 400 includes receiving, at a first time, a first plurality of network parameters associated with data transmitted from each of the plurality of cameras and a second plurality of network parameters associated with data received by the NVR. For example, in an aspect, computing device 300, processor 305, memory 310, network monitor component 315, and/or receiving component 325 may be configured to or may comprise means for receiving, at a first time (e.g., 12:00:00), a first plurality of network parameters associated with data transmitted from each of the plurality of cameras and a second plurality of network parameters associated with data received by the NVR.

In an alternative or additional aspect, network parameters comprise two or more of: a number of packets, a number of bytes, an average frame time delta, a maximum frame time delta, a minimum frame time delta, a peak bandwidth, or an average bandwidth.

At block 406, the method 400 includes identifying, using a plurality of rules, a discrepancy between the first plurality of network parameters and the second plurality of network parameters, wherein the discrepancy indicates that data from at least one camera in the plurality of cameras is not received by the NVR within a threshold period of time. For example, in an aspect, computing device 300, processor 305, memory 310, network monitor component 315, and/or identifying component 330 may be configured to or may comprise means for identifying, using a plurality of rules, a discrepancy between the first plurality of network parameters and the second plurality of network parameters, wherein the discrepancy indicates that data from at least one camera in the plurality of cameras is not received by the NVR within a threshold period of time.

In an alternative or additional aspect, a rule of the plurality of rules triggers a bandwidth adjustment based on latency, wherein the discrepancy is a frame delay such that a consecutive frame transmitted by the at least one camera is not received within the threshold period of time from when a previous frame was transmitted by the at least one camera. For example, camera 208d may send three packets at time t1, t2, and t3 to NVR 102. Two of those packets may be received at time t4 and t5, but the last packet may not be received at all or may be received after a threshold period of time (e.g., 1 second) which represents a significant delay.

In an alternative or additional aspect, a rule of the plurality of rules triggers a bandwidth adjustment based on packet loss, wherein the discrepancy is a threshold amount of packets (e.g., 10 packets) not being received by the NVR within the threshold period of time (e.g., 1 minute). For example, even if one packet is dropped in a span of 1 minute, there may be no discrepancy detected. However, if more than 10 packets are dropped or received by NVR 102 after a delay (e.g., 5 seconds), then the discrepancy may be detected.

In an alternative or additional aspect, a rule of the plurality of rules triggers a bandwidth adjustment based on bandwidth limits, wherein the discrepancy is a receiving peak bandwidth limit being less than a transmission peak bandwidth limit during the threshold period of time. For example, the receiving peak bandwidth limit may be 3 Mbps, whereas the transmission peak bandwidth limit may be 15 Mbps during a 1 minute window.

At block 408, the method 400 includes transmitting, to the at least one camera, an instruction to adjust a peak bandwidth limit of the at least one camera to a new value, in response to identifying the discrepancy. For example, in an aspect, computing device 300, processor 305, memory 310, network monitor component 315, and/or transmitting component 335 may be configured to or may comprise means for transmitting, to the at least one camera, an instruction to adjust a peak bandwidth limit of the at least one camera to a new value, in response to identifying the discrepancy.

For example, the peak bandwidth limit for a camera may be 80 Mbps and the adjustment may set a new value of the peak bandwidth limit as 75 Mbps. In this case, the limit is decremented by 5 Mbps.

Figure 5:
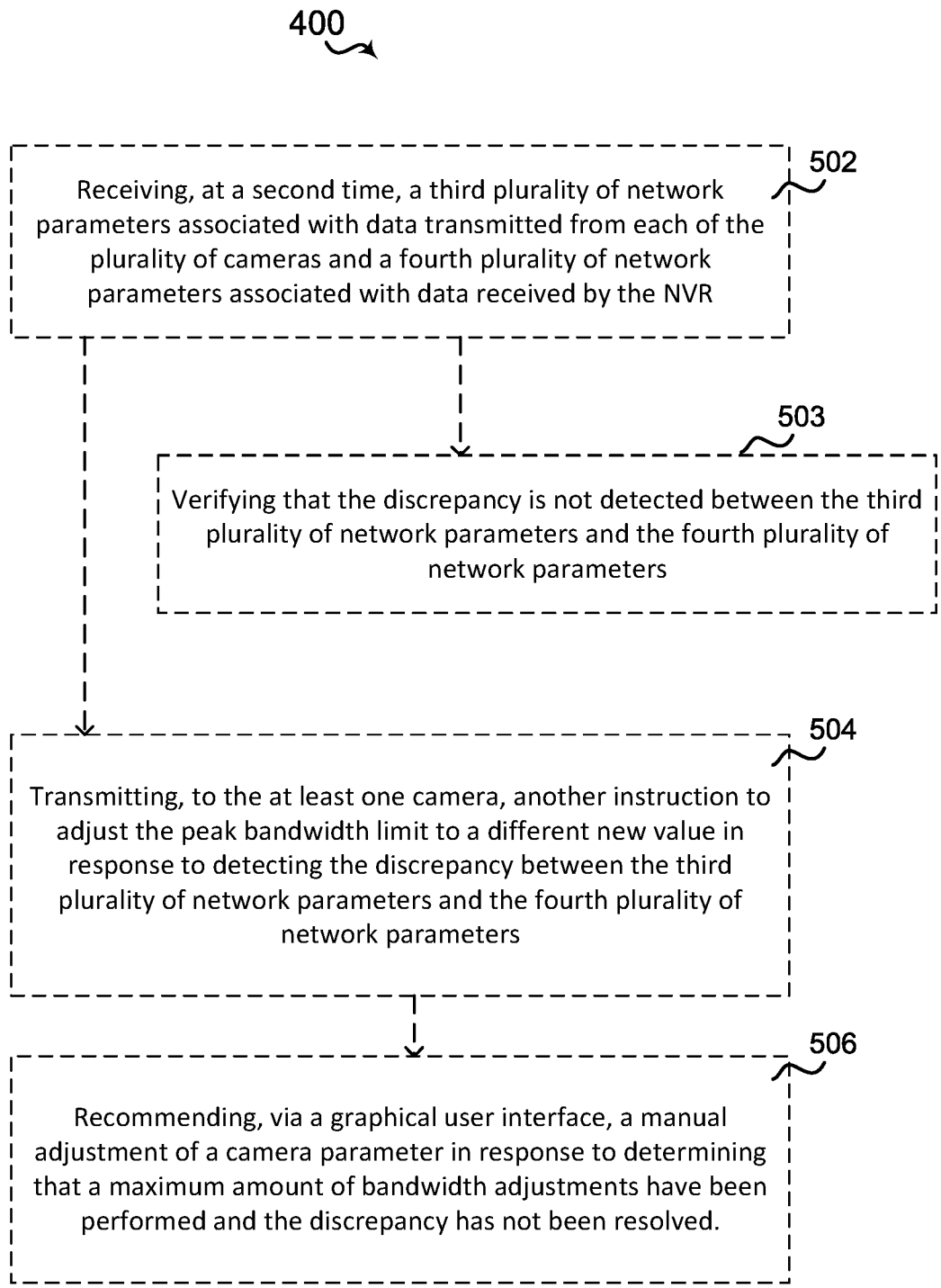
FIG. 5 is a flowchart of a method for verifying whether a discrepancy has been resolved.

Referring to FIG. 5, in an alternative or additional aspect, at block 502, the method 400 may further include receiving, at a second time subsequent to adjusting the peak bandwidth limit, a third plurality of network parameters associated with data transmitted from each of the plurality of cameras and a fourth plurality of network parameters associated with data received by the NVR. For example, in an aspect, computing device 300, processor 305, memory 310, network monitor component 315, and/or receiving component 345 may be configured to or may comprise means for receiving, at a second time subsequent to adjusting the peak bandwidth limit (e.g., 12:01:00), a third plurality of network parameters associated with data transmitted from each of the plurality of cameras and a fourth plurality of network parameters associated with data received by the NVR.

In this optional aspect, at block 503, the method 400 may further include verifying that the discrepancy is not detected between the third plurality of network parameters and the fourth plurality of network parameters. For example, in an aspect, computing device 300, processor 305, memory 310, network monitor component 315, and/or verifying component 347 may be configured to or may comprise means for verifying that the discrepancy is not detected between the third plurality of network parameters and the fourth plurality of network parameters. In this case, for example, the method 400 would conclude that the video network is operating well, and thus no configuration changes are needed. For example, referring to Table 1, it is possible that by making the bandwidth adjustments in block 408, the final two cameras (e.g., 192.168.1.14, 192.168.1.15) no longer have discrepancies and have an "Amber" status at the second time.

In this optional aspect, at block 504, the method 400 may further include transmitting, to the at least one camera, another instruction to adjust the peak bandwidth limit to a different new value in response to detecting the discrepancy between the third plurality of network parameters and the fourth plurality of network parameters. For example, in an aspect, computing device 300, processor 305, memory 310, network monitor component 315, and/or transmitting component 350 may be configured to or may comprise means for transmitting, to the at least one camera, another instruction to adjust the peak bandwidth limit to a different new value in response to detecting the discrepancy between the third plurality of network parameters and the fourth plurality of network parameters. For example, the peak bandwidth limit may be decremented by 5 Mbps again from 75 Mbps to 70 Mbps.

In this optional aspect, at block 506, the method 400 may further include recommending, via a graphical user interface, a manual adjustment of a camera parameter in response to determining that a maximum amount of bandwidth adjustments have been performed and the discrepancy has not been resolved. For example, in an aspect, computing device 300, processor 305, memory 310, network monitor component 315, and/or recommending component 355 may be configured to or may comprise means for recommending, via a graphical user interface, a manual adjustment of a camera parameter in response to determining that a maximum amount of bandwidth adjustments have been performed and the discrepancy has not been resolved. For example, if 5 adjustments have been made and packets are still being dropped, then a camera parameter adjustment may be needed.

In an alternative or additional aspect, the camera parameter is one of: frame rate, resolution, or bitrate. Reducing the camera parameter values may improve network performance. As mentioned previously, the network configuration module 112 may recommend camera parameters that the user should change. For example, network configuration module 112 may recommend that the user reduce a frame rate of the camera, lower the resolution of the camera, lower a bit rate of the camera, implement a compression algorithm, change a video codec (e.g., H264 to H265), etc. In some aspects, a user may select to restart the camera to possibly correct the discrepancy issues or disable possible firewalls.

Figure 6:
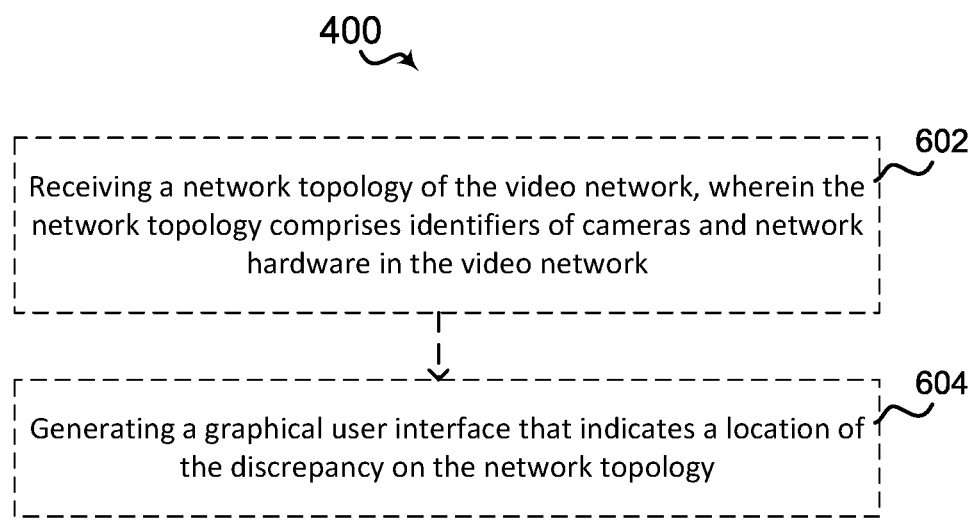
FIG. 6 is a flowchart of a method for generating a graphical user interface that indicates a location of the discrepancy on the network topology.

Referring to FIG. 6, in an alternative or additional aspect, at block 602, the method 400 may further include receiving a network topology of the video network, wherein the network topology comprises identifiers of cameras and network hardware in the video network. For example, in an aspect, computing device 300, processor 305, memory 310, network monitor component 315, and/or receiving component 345 may be configured to or may comprise means for receiving a network topology (e.g., network topology 106 depicted in FIG. 2) of the video network, wherein the network topology comprises identifiers of cameras and network hardware in the video network (e.g., IP addresses, MAC addresses, etc.).

In this optional aspect, at block 604, the method 400 may further include generating a graphical user interface that indicates a location of the discrepancy on the network topology. For example, in an aspect, computing device 300, processor 305, memory 310, network monitor component 315, and/or generating component 360 may be configured to or may comprise means for generating graphical user interface 104 that indicates a location of the discrepancy on network topology 106, such as in the example of FIG. 2 described above. In some aspects, the graphical user interface 104 may be table-based or may include a table portion that resembles the structure of Table 1 described above.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for adjusting bandwidth in video networks, comprising:
   monitoring a video network comprising a plurality of cameras and a network video recorder (NVR);
   receiving, at a first time, a first plurality of network parameters associated with data transmitted from each of the plurality of cameras and a second plurality of network parameters associated with data received by the NVR;
   identifying, using a plurality of rules, a discrepancy between the first plurality of network parameters and the second plurality of network parameters, wherein the discrepancy indicates that data from at least one camera in the plurality of cameras is not received by the NVR within a threshold period of time; and
   transmitting, to the at least one camera, an instruction to adjust a peak bandwidth limit of the at least one camera to a new value, in response to identifying the discrepancy.

2. The method of claim 1, further comprising:
   receiving, at a second time subsequent to adjusting the peak bandwidth limit, a third plurality of network parameters associated with data transmitted from each of the plurality of cameras and a fourth plurality of network parameters associated with data received by the NVR; and
   verifying that the discrepancy is not detected between the third plurality of network parameters and the fourth plurality of network parameters.

3. The method of claim 1, further comprising:
   receiving, at a second time subsequent to adjusting the peak bandwidth limit, a third plurality of network parameters associated with data transmitted from each of the plurality of cameras and a fourth plurality of network parameters associated with data received by the NVR; and
   transmitting, to the at least one camera, another instruction to adjust the peak bandwidth limit to a different new value in response to detecting the discrepancy between the third plurality of network parameters and the fourth plurality of network parameters.

4. The method of claim 3, further comprising:
   recommending, via a graphical user interface, a manual adjustment of a camera parameter in response to determining that a maximum amount of bandwidth adjustments have been performed and the discrepancy has not been resolved.

5. The method of claim 4, wherein the camera parameter is one of: frame rate, resolution, or bitrate.

6. The method of claim 1, further comprising:
   receiving a network topology of the video network, wherein the network topology comprises identifiers of cameras and network hardware in the video network; and
   generating a graphical user interface that indicates a location of the discrepancy on the network topology.

7. The method of claim 1, wherein a rule of the plurality of rules triggers a bandwidth adjustment based on latency, wherein the discrepancy is a frame delay such that a consecutive frame transmitted by the at least one camera is not received within the threshold period of time from when a previous frame was transmitted by the at least one camera.

8. The method of claim 1, wherein a rule of the plurality of rules triggers a bandwidth adjustment based on packet loss, wherein the discrepancy is a threshold amount of packets not being received by the NVR within the threshold period of time.

9. The method of claim 1, wherein a rule of the plurality of rules triggers a bandwidth adjustment based on bandwidth limits, wherein the discrepancy is a receiving peak bandwidth limit being less than a transmission peak bandwidth limit during the threshold period of time.

10. The method of claim 1, wherein network parameters comprise two or more of: a number of packets, a number of bytes, an average frame time delta, a maximum frame time delta, a minimum frame time delta, a peak bandwidth, or an average bandwidth.

11. An apparatus for adjusting bandwidth in video networks, comprising:
one or more memory; and
one or more processors, individually or in combination, coupled with the memory and configured to:
monitor a video network comprising a plurality of cameras and a network video recorder (NVR);
receive, at a first time, a first plurality of network parameters associated with data transmitted from each of the plurality of cameras and a second plurality of network parameters associated with data received by the NVR;
identify, using a plurality of rules, a discrepancy between the first plurality of network parameters and the second plurality of network parameters, wherein the discrepancy indicates that data from at least one camera in the plurality of cameras is not received by the NVR within a threshold period of time; and
transmit, to the at least one camera, an instruction to adjust a peak bandwidth limit of the at least one camera to a new value, in response to identifying the discrepancy.

12. The apparatus of claim 11, wherein one or more processors further configured to:
receive, at a second time subsequent to adjusting the peak bandwidth limit, a third plurality of network parameters associated with data transmitted from each of the plurality of cameras and a fourth plurality of network parameters associated with data received by the NVR; and
verifying that the discrepancy is not detected between the third plurality of network parameters and the fourth plurality of network parameters.

13. The apparatus of claim 11, wherein one or more processors are further configured to:
receive, at a second time subsequent to adjusting the peak bandwidth limit, a third plurality of network parameters associated with data transmitted from each of the plurality of cameras and a fourth plurality of network parameters associated with data received by the NVR; and
transmit, to the at least one camera, another instruction to adjust the peak bandwidth limit to a different new value in response to detecting the discrepancy between the third plurality of network parameters and the fourth plurality of network parameters.

14. The apparatus of claim 13, wherein one or more processors are further configured to:
recommend, via a graphical user interface, a manual adjustment of a camera parameter in response to determining that a maximum amount of bandwidth adjustments have been performed and the discrepancy has not been resolved.

15. The apparatus of claim 14, wherein the camera parameter is one of: frame rate, resolution, or bitrate.

16. The apparatus of claim 11, wherein one or more processors are further configured to:
receive a network topology of the video network, wherein the network topology comprises identifiers of cameras and network hardware in the video network; and
generate a graphical user interface that indicates a location of the discrepancy on the network topology.

17. The apparatus of claim 11, wherein a rule of the plurality of rules triggers a bandwidth adjustment based on latency, wherein the discrepancy is a frame delay such that a consecutive frame transmitted by the at least one camera is not received within the threshold period of time from when a previous frame was transmitted by the at least one camera.

18. The apparatus of claim 11, wherein a rule of the plurality of rules triggers a bandwidth adjustment based on packet loss, wherein the discrepancy is a threshold amount of packets not being received by the NVR within the threshold period of time.

19. The apparatus of claim 11, wherein a rule of the plurality of rules triggers a bandwidth adjustment based on bandwidth limits, wherein the discrepancy is a to receive peak bandwidth limit being less than a transmission peak bandwidth limit during the threshold period of time.

20. The apparatus of claim 11, wherein network parameters comprise two or more of: a number of packets, a number of bytes, an average frame time delta, a maximum frame time delta, a minimum frame time delta, a peak bandwidth, or an average bandwidth.

\* \* \* \* \*